June 3, 1930.  B. OBER  1,761,992
APPARATUS FOR MANUFACTURING ACID PHOSPHATE
Filed Aug. 18, 1925  5 Sheets-Sheet 1
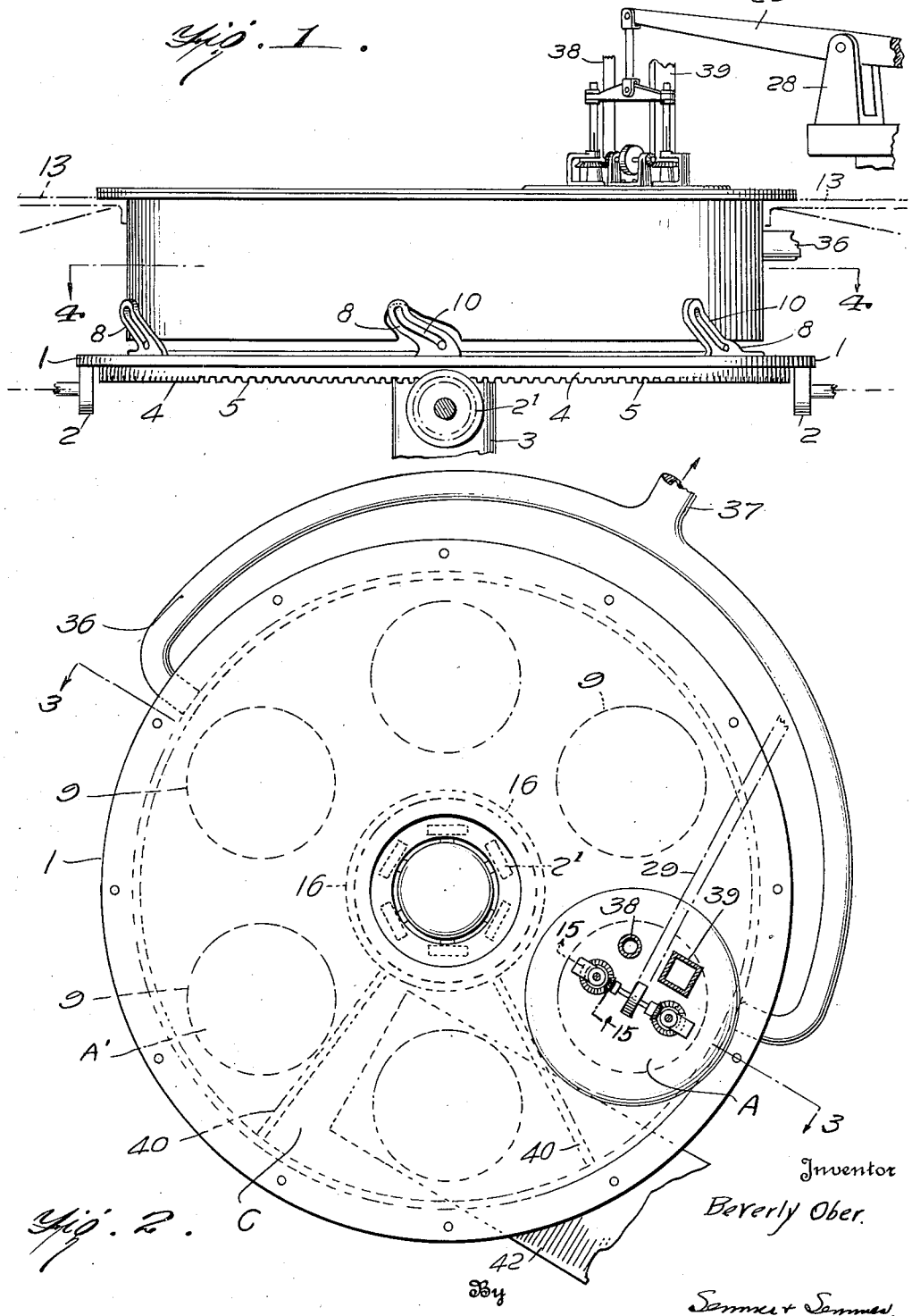
Inventor
Beverly Ober.

June 3, 1930. B. OBER 1,761,992
APPARATUS FOR MANUFACTURING ACID PHOSPHATE
Filed Aug. 18, 1925 5 Sheets-Sheet 2
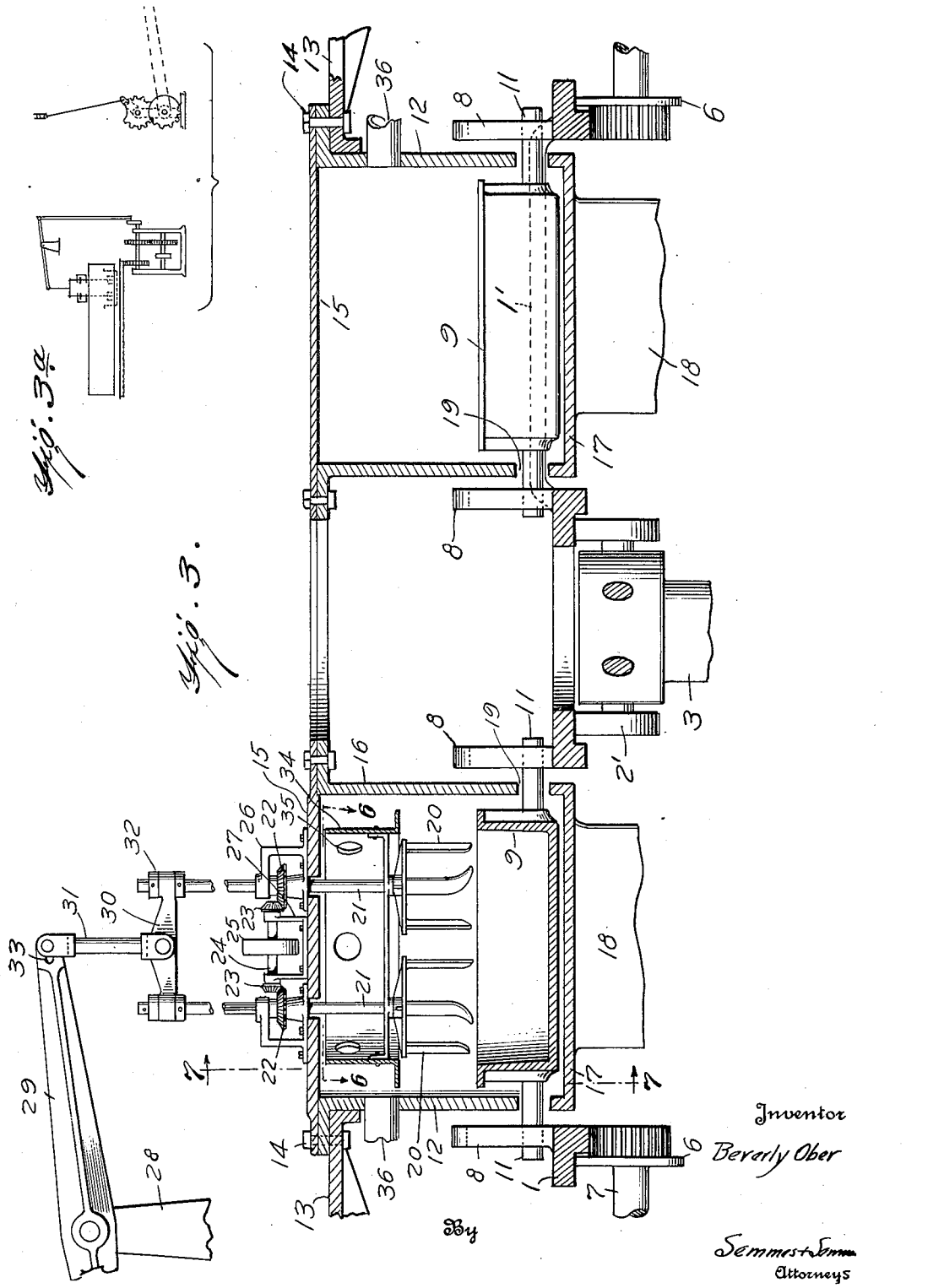
Inventor
Beverly Ober
By
Semmes+Semmes
Attorneys June 3, 1930.  B. OBER  1,761,992
APPARATUS FOR MANUFACTURING ACID PHOSPHATE
Filed Aug. 18, 1925  5 Sheets-Sheet 3
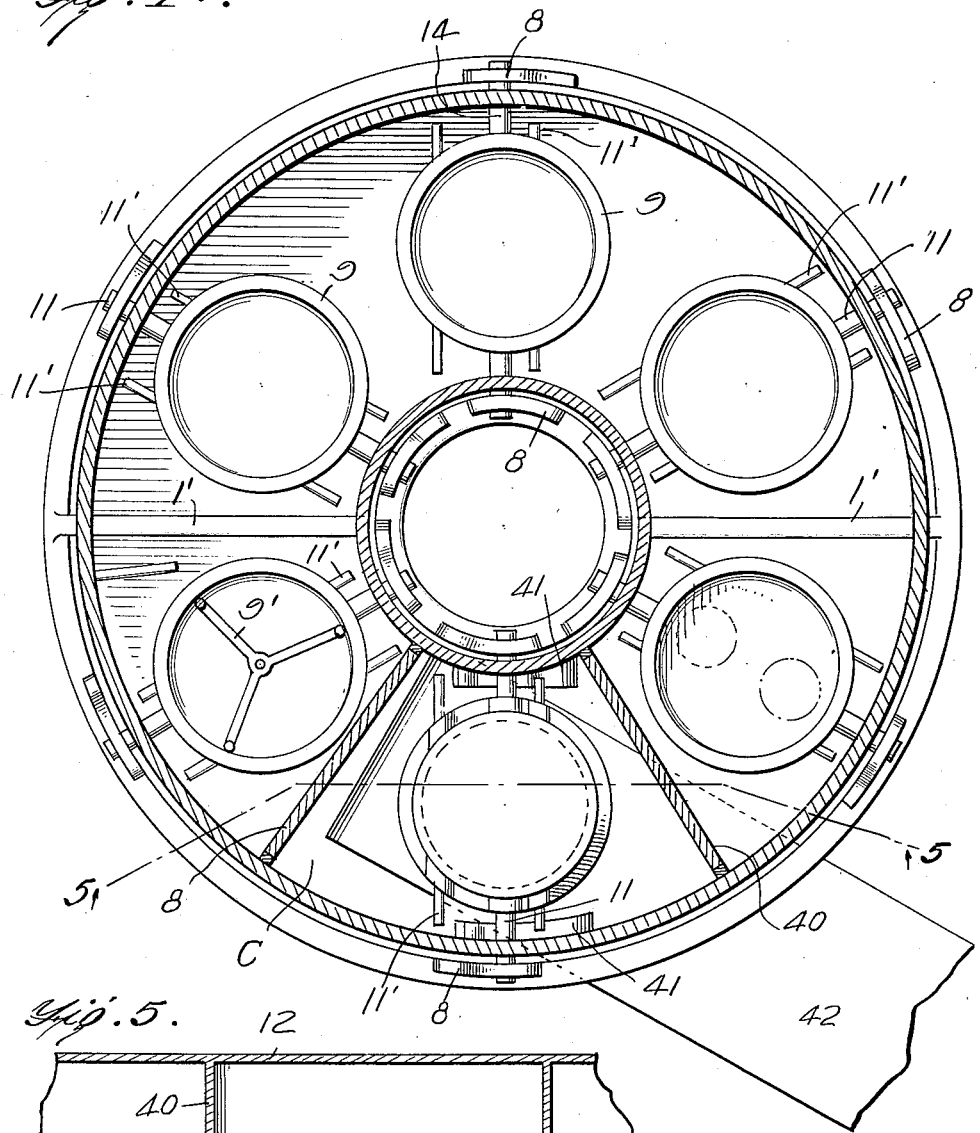
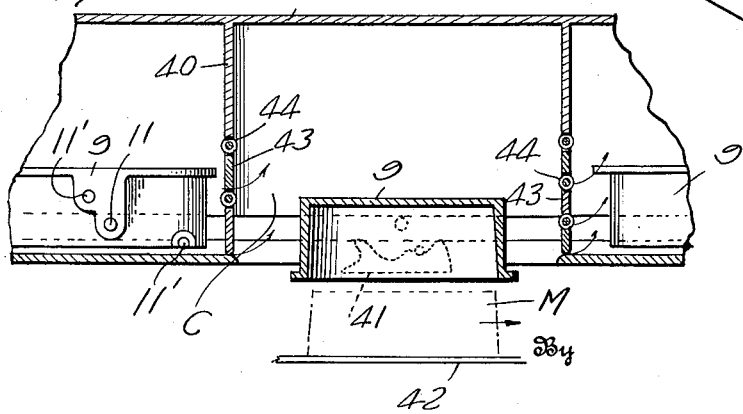
Inventor
Beverly Ober
By Semmes + Semmes
Attorneys June 3, 1930. B. OBER 1,761,992
APPARATUS FOR MANUFACTURING ACID PHOSPHATE
Filed Aug. 18, 1925    5 Sheets-Sheet 4
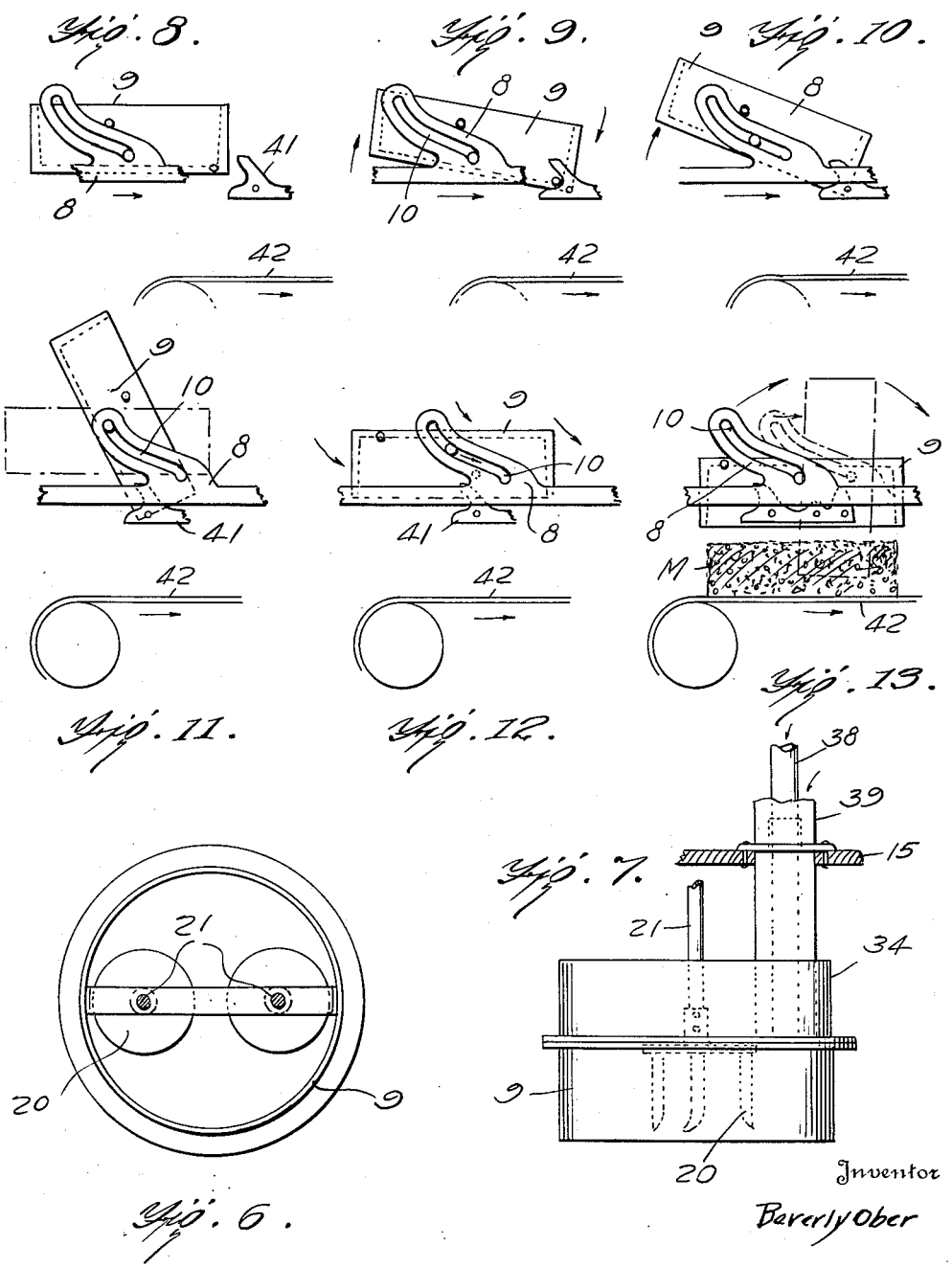
Inventor
Beverly Ober
By Semmes + Semmes
Attorney June 3, 1930.  B. OBER  1,761,992
APPARATUS FOR MANUFACTURING ACID PHOSPHATE
Filed Aug. 18, 1925    5 Sheets-Sheet 5
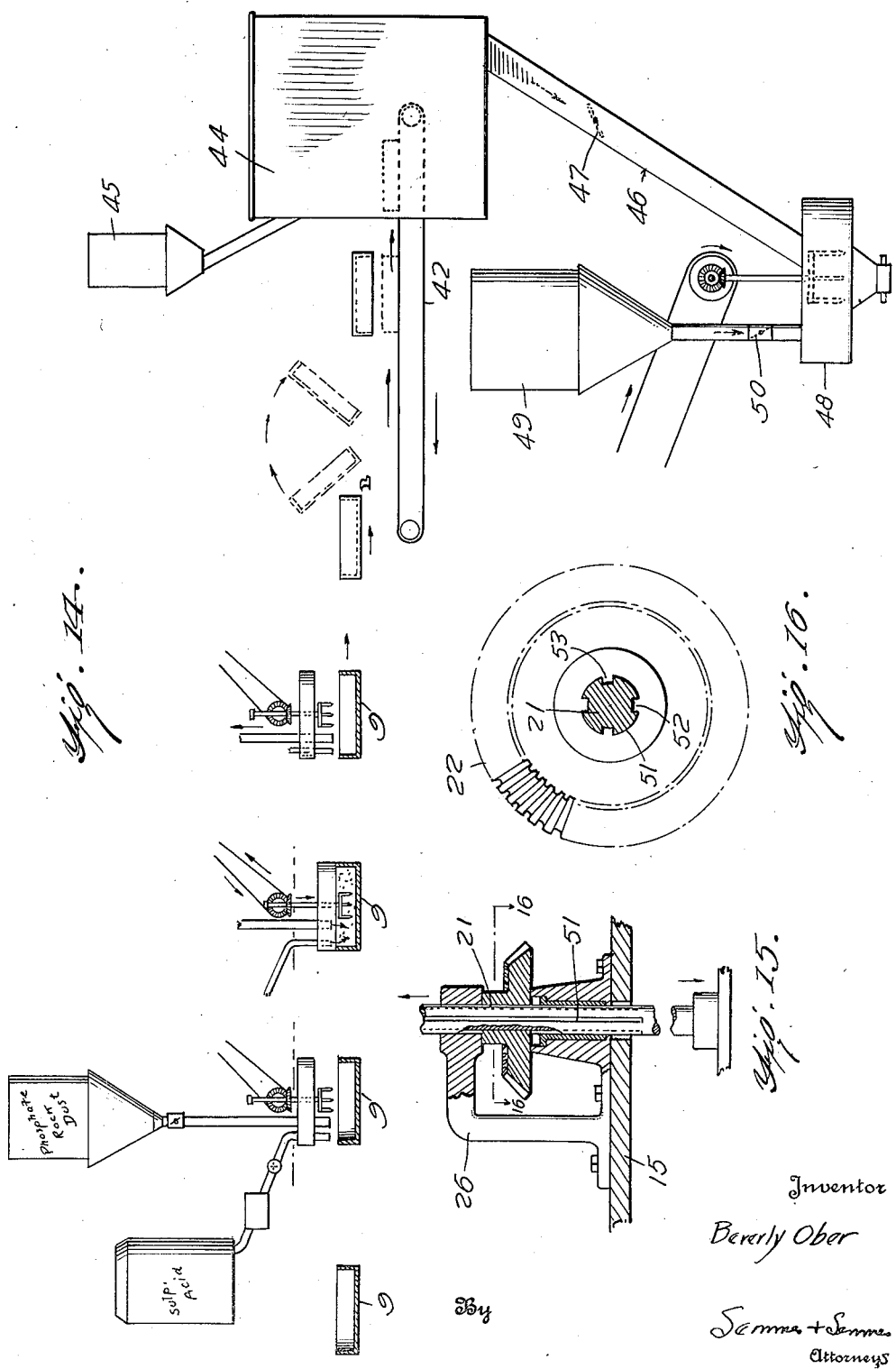

Patented June 3, 1930

1,761,992

UNITED STATES PATENT OFFICE

BEVERLY OBER, OF BALTIMORE, MARYLAND, ASSIGNOR TO G. OBER & SONS COMPANY, OF BALTIMORE, MARYLAND

APPARATUS FOR MANUFACTURING ACID PHOSPHATE

Original application filed June 5, 1925, Serial No. 35,110. Divided and this application filed August 18, 1925. Serial No. 51,049.

My invention relates to an apparatus for manufacturing acid phosphate or super-phosphate, and is a division of my application Serial No. 35,110, filed June 5, 1925.

One of the common methods of manufacturing acid phosphate or super-phosphate from phosphate rock is to grind the phosphate rock and treat it with sulphuric acid. The ground rock and acid are discharged into a den, and remain therein for a certain period of time to permit further chemical action. The mixture then becomes a spongy mass which is broken down by some means and removed to a curing chamber shed where additional chemical action takes place.

The methods heretofore employed for manufacturing acid phosphate have many disadvantages. Usually the charges of phosphate rock and acid, after changing to a solid form, are delivered to a disintegrating machine which breaks down the charges.

The effect of using a disintegrator is to seal the pores of the semi-solid mass, which impedes the action of crystallization. In my apparatus, the charges after being mixed are handled in such a manner as to maintain the porosity of the mass substantially the same as when the charge is mixed.

Sometimes the charges of phosphate rock and acid are transferred to a den into which they are dumped one upon another. The result of this treatment is to seal the pores of the spongy mass, thus hindering the action of crystallization.

The arrangement, to be hereinafter described, consists essentially of a revolving frame having a series of containers mounted thereon for the reception of a mixture or batch of ground phosphate rock and acid, means for suitably mixing a batch, means to discharge the batch from a container at a predetermined time after mixing, and means to convey the batch to a drying room without disturbing the porosity due to the chemical action of the ingredients mixed.

When phosphate rock and an acid are mixed together they first form a liquid or semi-liquid mass which gives off several gases of fluorine, carbon, etc. As the semi-liquid mass solidifies, it does so in a porous mass due to the escaping gases. This porosity can be increased in several ways; by the addition of lime to the phosphate rock before mixing, or by heating the acid to fairly high degrees of heat.

The time required for the setting up of this semi-liquid mass varies with several factors, among which are the quality of the phosphate rock used, the fineness to which the rock is ground before mixing, and the amount and strength of the acid. All of these factors are so well known and controlled that the mass can be said to solidify sufficiently for handling in approximately fifteen minutes.

This porous mass is not yet complete in its chemical reactions. The actions of crystallization must be completed, also the free phosphoric acid which is always present must be reduced to a minimum to be best handled industrially and commercially.

An object of my invention is to provide an apparatus for manufacturing acid phosphate whereby a batch of ground phosphate rock and an acid is thoroughly mixed to form a porous mass, which is dried without substantially disturbing its porosity.

Another object of my invention is to provide means for agitating the batch while in the containers.

Still another object of my invention is to provide means to convey the containers to the agitating mechanism.

Yet another object of my invention is to provide means to discharge the containers at a predetermined time.

A further object of my invention is to increase the available phosphoric acid obtained from a mixture of phosphate rock and acid by combining a quantity of ground phosphate rock with the mixture after it has been agitated.

A still further object of my invention is to treat the mixture of ground phosphate rock and acid so that it is prepared for commercial use with the least possible handling.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a general elevational view of the chamber for housing a battery of acid phosphate mixing pans or molds;

Fig. 2 is a plan view of the chamber;

Fig. 3 is a vertical sectional view along line 3—3 of Fig. 2;

Fig. 3ª is a diagrammatical view of the transmission;

Fig. 4 is a sectional view along line 4—4 of Fig. 1;

Fig. 5 is a sectional view along line 5—5 of Fig. 4;

Fig. 6 is a sectional view of the mixer, taken along line 6—6 of Fig. 3, looking in the direction of the arrows;

Fig. 7 is a detail view of acid and dust inlets along line 7—7 of Fig. 3;

Figs. 8 to 13 inclusive show diagrammatic views of the tripping mechanism used to tip the molds;

Fig. 14 is a diagrammatic view showing the different steps in the operation of my apparatus.

Fig. 15 is a sectional view along line 15—15 of Fig. 2;

Fig. 16 is a sectional view along line 16—16 of Fig. 15.

Referring to the drawings, and more particularly to Figs. 1, 2 and 3, the apparatus consists of a circular frame 1 supported by means of a plurality of rollers 2 and a central support member 3, to which are attached a group of rollers 2′. The frame 1 is provided with an annular shoulder projection 4 having teeth 5 cut therein, adapted to mesh with gear wheels 6 attached to shafts 7. The shafts are rotated by means of a motor or other source of power and cause the frame to be revolved.

Mounted upon the frame are a series of guide supports 8 which support a plurality of containers or molds 9 adapted to receive a mixture of ground phosphate rock and a suitable acid. The guides 8 are provided with curvilinear slots 10 which receive rod extensions 11 attached to the containers. The function of the curved slots in the guide members will be hereinafter described in connection with the trip operating device which is used to discharge the containers.

The containers 9 are substantially cylindrical in form, and it will be noted that the inside diameter of the base of the container is slightly less than the diameter of the top. This gives a slope to the inner surface so as to facilitate the discharge of material from the containers when they are inverted. In addition to the rod extensions 11, the containers are provided with rod members 11′ which cooperate with suitable trip members when the containers are discharged.

Fitting down over the containers and acting as a closure therefor, is a stationary housing 12. The housing is cylindrical in form and is attached to suitable support members 13 by bolt means 14. The housing is provided with a cover 15 having a concentric cylindrical member 16 attached thereto. The cylindrical member forms with the housing an annular compartment in which are placed the containers. A base 17, supported by the members 18, is provided for the housing, and between the base and upper portion of the housing are openings 19 to permit the passage of the rod extensions 11 attached to the containers.

Mounted upon the cover 15 is a suitable agitating mechanism for stirring or mixing a batch of material in one of the containers. This stirring mechanism comprises a plurality of blades 20 mounted upon shafts 21 which carry gear wheels 22 adapted to mesh with gears 23 attached to a shaft 24. Carried on the shaft 24 is a pulley 25. This pulley, when rotated by means of a suitable source of power, causes the blades, through the gear mechanism and the shafts, to revolve and thoroughly mix the materials in the containers. The gear mechanism and the shafts of the agitating device are mounted upon the cover 15 by suitable support brackets 26 and 27.

The shafts 21 are adapted to be raised and lowered in the containers 9 by a fulcrum means comprising a support 28 and an arm 29. The arm is attached to a cross bar 30 through a connecting rod member 31. The shafts are connected with the cross member by means of passing the shafts through the bar and affixing suitable fastening means 32 to the shafts. It will be noticed that the arm 29 is provided with a slot 33 where the connection to the rod 31 engages the arm. The purpose of this slot is to permit free movement of the arms of the raising device when the blades are lifted from the operative position.

Mounted upon the shafts above the blades 20 is a cylindrical casing 34 having openings 35 therein. The purpose of this casing is to provide a cover member for a container. When the blades are lowered and the mixture in the container is agitated, the casing 34 prevents the batch from being splashed out of the container on to the housing or other parts of the apparatus. The openings 35 are provided to allow gases arising from the mixture to escape when the cover is on the container or when the blades are in the raised position. The gases which arise from the mixture pass from the housing through suitable pipe connections 36 which may have a suction fan or other suitable means attached to the pipe connections at 37.

Acid and ground phosphate rock are introduced into the container by means of an acid pipe 38 and a chute 39 which are mounted upon the housing cover 15 near the agitating mechanism. The pipe connects with a source of acid supply and the chute is adapted to carry a supply of ground phosphate rock. Both the pipe and the chute empty into a container.

Referring to Fig. 4, I have shown the arrangement of the containers and the method of mounting them upon the revoluble frame. In the present arrangement I have shown six containers, but the number may be increased to give any desired capacity for the apparatus.

The elements of the revoluble frame 1 are connected by means of cross pieces 1' which serve to strengthen and brace the frame structure. A compartment is formed at C within the housing by radial closure means 40. The compartment C is open at the bottom to permit the mixture within the containers to be discharged. The container as shown in the compartment is in inverted position. It is brought into this position by the trip means 41 which is attached to the housing and co-acts with the extension rods 11'. Additional means to assist in discharging the batch from the containers is provided by a stirring means 9' which is adapted to revolve and loosen the batch from the bottom of the container in order that it may be more easily discharged. The action of the tripping device will be hereinafter described. The discharged material is removed to a suitable drying room by the conveyor means 42.

Referring to Fig. 5, I have shown the positions of a container as it enters the compartment C and is discharged. The mold M formed of phosphate rock and acid is dropped from the container upon the conveyor 42 and transported to a drying room. The closure 40 is made flexible by means of the sections 43 hinged as at 44. By this means the containers are all closed, except the one being discharged, in order to prevent gases from escaping to the atmosphere during the time the containers travel after the mixing operation. The hinged portions of the closure means 40 move in an arc, as indicated by the dotted lines, when a container passes into the compartment C and is discharged.

The operation of my device is as follows: Assuming that a charge of ground phosphate rock and acid has been introduced into a container in the position A shown in Fig. 2. The material is passed through the acid pipe and the phosphate rock chute and the agitating mechanism is operating. At this time the revoluble frame is stationary. After the charge is thoroughly mixed, the agitators are lifted by means of the fulcrum, the revoluble frame begins to rotate, and the container in position A passes from under the agitating device. After the revoluble frame passes through a certain length of travel, another container is carried into position under the agitating mechanism, the blades are lowered, and the charge which has been introduced into the container is thoroughly mixed. When the container in the position A reaches the position A', then on the next mixing operation, the container is carried into the compartment C and its contents discharged in the form of a mold upon the conveyor. The molds are transported to a suitable drying room and prepared for commercial use.

It will be understood that any suitable means may be employed to connect the movable elements of the apparatus and cause them to act in synchronism. When the agitating blades are removed from a container, power is supplied to the frame upon which the containers are mounted, and causes it to revolve. When the blades are lowered into a container, the rotation of the frame is arrested. A central source of power may be used to supply the apparatus.

Referring to Fig. 3ª, I have shown a diagrammatic view of one form for connecting the revoluble frame, the agitating means and the source of power. This arrangement is adapted to connect the source of power with the frame and the agitators alternately after particular intervals during the operation of the device.

Referring to Fig. 6, I have shown the position of the agitating mechanism when the groups of blades are lowered into a container.

In Fig. 7 I have shown the blades lowered into a container. The casing which is provided to prevent splashing of the material during the mixing operation is shown in position on top of a container.

Referring to Figs. 8 to 13 inclusive, I have shown a container passing through several stages of the tripping operation. The operation of the tripping device is as follows: A container having a mixture of ground phosphate rock and acid is carried along on the revoluble frame until one of the rod extensions 11', attached at the base of the container comes into contact with the trip cam 41 which is mounted upon the stationary housing. The rod extension 11' engages with the cam member and arrests the forward movement of the container which causes the container to be carried upwards in the curved slot 10 by means of the rod supports 11 to which the container is attached. When the rod supports 11 reach the end of their travel in the slots 10, the container is turned over and the mold M is discharged upon the conveyor 42. After the container is discharged, it is returned to its upright position by means of the action of the cam upon one of the rods 11′, and it is then in position to receive another charge of acid and phosphate rock.

Referring to Fig. 14, I have shown a diagrammatic view of the different steps in the operation of my apparatus. The sulphuric acid and phosphate rock dust are introduced into the container, the blades are lowered and the batch thoroughly mixed, then the blades are raised and the container passes from under the agitator and is carried with the revoluble frame until it encounters the tripping device. The container is discharged and the mold transported to a suitable drying room 44, in which the mixture is air treated. Connected with the drying room is a source of raw phosphate dust 45 which may be applied to the mixture before or after the mixture has been treated in the drying room.

A suitable chute 46, provided with a valve 47, connects the drying room with a mixing unit 48. A hopper 49 containing raw phosphate dust connects with the mixing unit and a suitable valve 50 is provided in a pipe connection 51 between the hopper and the mixing unit. The purpose of the hopper is to supply additional phosphate dust during the mixing operation before the acid is packed and ready for shipment.

Referring to Fig. 15, I have shown one of the shafts 21 upon which the agitators 20 are mounted. The shafts are provided with splines 52 adapted to slide through the support member 26 and the gear 22. This arrangement is provided to allow the movement of the blades within the housing.

Referring to Fig. 16, I have shown one of the gears 22 having slots 53 cut therein which are adapted to receive the splines 52 on the shafts 21.

Many of the apparatuses used for manufacturing acid phosphate are equipped with some sort of knives or other devices used to chip the material before preparing it for commercial use. All break down the porosity. In my apparatus the chipping device has been entirely eliminated and the porosity maintained. The mixture formed in the containers is discharged in the form of a mold and carried to a suitable drying room where it is air treated. It is not necessary to take the acid phosphate to a pile in storage to complete the chemical action and drying, and it is to be understood that the material is not necessarily in mold form, the essential feature being that the porosity must be maintained. By handling the charges individually, the least possible change in the porosity of the mass of a charge is obtained.

With modern machines for grinding the phosphate rock to a very fine state, the action is completed almost immediately, except those actions of crystallization which are accomplished by drying in air, which may be hot or cold, or steam drying may be used. Any small amount of phosphate lime not converted into soluble form immediately is not of sufficient commercial value to warrent the expense of storing.

While I have shown and described the preferred embodiment of my invention, I wish it to be understood that I do not confine myself to the precise details of construction set forth by way of illustration, as it is apparent that many changes and variations may be made therein, by those skilled in the art, without departing from the spirit of the invention, or exceeding the scope of the appended claims.

I claim:

1. A device of the class described comprising a plurality of containers carried by a rotatable carrier, a closure for said carrier, and a mixing means carried by said closure adapted to operate within said containers.

2. An apparatus for manufacturing acid phosphate comprising a plurality of rotatable and invertable containers, and a combined stirring and mixing means coacting with said containers.

3. An apparatus for manufacturing acid phosphate comprising a revoluble frame, a plurality of containers mounted thereon adapted to receive a mixture of ground phosphate rock and an acid, means to stir the mixture, and means to discharge the containers at a predetermined time.

4. An apparatus for manufacturing acid phosphate comprising a revoluble frame, a plurality of containers mounted upon the frame in spaced relation and adapted to receive a mixture of ground phosphate rock and an acid, means to stir the mixture, and means to discharge the container at a predetermined time.

5. An apparatus for manufacturing acid phosphate comprising a revoluble frame, a plurality of guide members mounted upon the frame, containers carried by the guide members adapted to receive a mixture of ground phosphate rock and an acid, means to stir the mixture, and means to discharge the containers at a predetermined time.

6. An apparatus for manufacturing acid phosphate comprising a revoluble frame, a plurality of containers mounted thereon adapted to receive a mixture of ground phosphate rock and an acid, a stationary housing surrounding the containers, means to agitate the mixture in the containers, and means to discharge the containers at a predetermined time.

7. An apparatus for manufacturing acid phosphate comprising a revoluble frame, a plurality of containers mounted thereon adapted to receive a mixture of ground phosphate rock and an acid, a stationary housing enclosing the containers, a cover for the housing, means to agitate the mixture in the containers, and means to discharge the containers at a predetermined time.

8. An apparatus for manufacturing acid phosphate comprising a revoluble frame, means to rotate the frame intermittently, a plurality of containers mounted upon the frame adapted to receive a mixture of ground phosphate rock and acid, a housing enclosing the containers, a cover for the housing, means mounted upon the cover to agitate the mixture in the containers, and means to discharge the containers at a predetermined time.

9. An apparatus for manufacturing acid phosphate comprising a revoluble frame, means to revolve the frame intermittently, a plurality of containers mounted upon the frame adapted to receive a mixture of ground phosphate rock and an acid, a stationary housing enclosing the containers, a cover for said housing, means mounted upon the cover to agitate the mixture in the containers, means to discharge the containers at a predetermined time, and a conveyor means adapted to carry the discharged material to a storage chamber.

10. An apparatus for manufacturing acid phosphate comprising a revoluble frame, means to revolve the frame intermittently, a plurality of containers mounted upon the frame adapted to receive a mixture of ground phosphate rock and acid, means to agitate the mixture, and means to automatically discharge the containers at a predetermined time.

11. An apparatus for manufacturing acid phosphate comprising a revoluble frame supported upon a series of rollers, said frame being provided with an annular shoulder projection having teeth cut therein adapted to mesh with drive wheels, means to rotate the drive wheels intermittently, a plurality of containers mounted upon the frame adapted to receive a mixture of ground phosphate rock and an acid, means to agitate the mixture, and means to automatically discharge the containers at a predetermined time.

12. An apparatus for manufacturing acid phosphate comprising a revoluble frame, means to rotate the frame, a plurality of guide members mounted upon the frame in spaced relation, containers carried by the guides adapted to receive a mixture of ground phosphate rock and an acid, means to agitate the mixture, and means to discharge the containers at a predetermined time.

13. An apparatus for manufacturing acid phosphate comprising a revoluble frame, means to rotate the frame intermittently, a plurality of guide members mounted upon the frame in spaced relation, said members having curved slots cut therein, containers carried by the guides adapted to receive a mixture of ground phosphate rock and sulphuric acid, means to agitate the mixture, and means to automatically discharge the containers at a predetermined time.

14. An apparatus for manufacturing acid phosphate comprising a revoluble frame, means to rotate the frame intermittently, a plurality of guide members mounted in pairs in spaced relation upon the frame, a series of containers having rod extensions adapted to seat in the guide members, said containers being adapted to receive a mixture of phosphate rock and sulphuric acid, means to agitate the mixture, and means to discharge the containers at a predetermined time.

15. An apparatus for manufacturing acid phosphate comprising a revoluble frame, means to rotate the frame intermittently, a plurality of guide members mounted in pairs in spaced relation upon the frame, a series of cylindrical containers having rod members at diametrically opposite positions adapted to seat in the guide members, said containers being adapted to receive a mixture of phosphate rock and sulphuric acid, means to agitate the mixture, and means to discharge the containers at a predetermined time.

16. An apparatus for manufacturing acid phosphate comprising a revoluble frame, means to rotate the frame intermittently, a plurality of guide members mounted in pairs in spaced relation upon the frame, a series of cylindrical containers having a plurality of rod extensions, two of the rod extensions of each container being attached at diametrically opposite points, and adapted to seat in the guide members, the containers being adapted to receive a mixture of phosphate rock and sulphuric acid, means to agitate the mixture, and means to discharge the containers at a predetermined time.

17. An apparatus for manufacturing acid phosphate comprising a revoluble frame, a plurality of guide members mounted thereon, containers carried by the guide members adapted to receive a mixture of ground phosphate rock and an acid, a cylindrical stationary housing enclosing the containers, and means to discharge the containers at a predetermined time.

18. An apparatus for manufacturing acid phosphate comprising a revoluble frame, a plurality of containers adapted to receive a mixture of ground phosphate rock and an acid, a cylindrical stationary housing enclosing the containers, a cover for the housing, a cylindrical member attached to the housing and concentric therewith, a compartment formed within the housing by suitable closure means attached to the housing and the concentric member, means mounted upon the housing cover to agitate the mixture in the containers, and means to discharge the containers at a predetermined time.

19. An apparatus for manufacturing acid phosphate comprising a revoluble frame, a plurality of guide members mounted thereon, containers carried by the guide members adapted to receive a mixture of ground phosphate rock and an acid, a cylindrical stationary housing enclosing the containers, a cover for the housing, a cylindrical member attached to the inside of the housing and concentric therewith, a compartment formed within the housing by flexible closure means radially attached to the housing and the concentric member, means mounted upon the housing cover to agitate the mixture in the containers, and means to discharge the containers at a predetermined time.

20. An apparatus for manufacturing acid phosphate comprising a revoluble frame, means to rotate the frame intermittently, a plurality of guide members mounted upon the frame, containers carried by the guide members adapted to receive a mixture of ground phosphate rock and an acid, means to agitate the mixture in the containers comprising a plurality of blades, means to rotate the blades, and means to discharge the containers at a predetermined time.

21. An apparatus for manufacturing acid phosphate comprising a revoluble frame, means to rotate the frame intermittently, a plurality of guide members mounted upon the frame, containers carried by the guide adapted to receive a mixture of ground phosphate rock and an acid, means to agitate the mixture comprising a plurality of blades mounted upon independent shafts, means to rotate the shafts, and means to discharge the containers at a predetermined time.

22. An apparatus for manufacturing acid phosphate comprising a revoluble frame, means to rotate the frame intermittently, a plurality of guide members mounted upon the frame, containers carried by the guides adapted to receive a mixture of ground phosphate rock and an acid, means to agitate the mixture comprising groups of blades attached to independent shafts, a cylindrical casing having openings therein slidably mounted on the shafts above the blades, means to adjust the height of the blades with respect to the containers, means to rotate the shafts, and means to discharge the containers at a predetermined time.

23. An apparatus for manufacturing acid phosphate comprising a revoluble frame supported upon a series of rollers, means to rotate the frame intermittently, pairs of guide members mounted upon the frame in spaced relation, each guide member having a curved slot cut therein, a plurality of cylindrical containers having rod members at diametrically opposite positions adapted to seat in the curved slots of the guide members, said containers being adapted to receive a mixture of ground phosphate rock and an acid, means to agitate the mixture, and means to discharge the containers at a predetermined time.

24. An apparatus for manufacturing acid phosphate comprising a revoluble frame supported upon a series of rollers, said frame being provided with an annular shoulder projection having teeth adapted to mesh with drive wheels, means to rotate the drive wheels intermittently, pairs of guide members mounted upon the frame in spaced relation, each guide member having a curved slot cut therein, a series of containers having a plurality of rod extensions, two of the rod extensions being attached to a container at diametrically opposite positions and adapted to seat in the guide members, the containers being adapted to receive a mixture of phosphate rock and acid, means to agitate the mixtures in each container, and means to discharge the containers at a predetermined time.

25. An apparatus for manufacturing acid phosphate comprising a revoluble frame, means to rotate the frame intermittently, a plurality of guide members mounted upon the frame in spaced relation, said members having curved slots therein, a series of containers having rod extensions adapted to seat in the guide members, said containers being adapted to receive a mixture of ground phosphate rock and an acid, a cylindrical stationary housing enclosing the containers, a cover for the housing, a cylindrical member attached to the inside of the housing and concentric therewith, a compartment formed within the housing by suitable closure means attached to the housing and the concentric member, means mounted upon the housing cover to agitate the mixture in the container, and means to discharge the containers at a predetermined time.

26. An apparatus for manufacturing acid phosphate comprising a revoluble frame, means to rotate the frame intermittently, a plurality of guide members mounted upon the frame in spaced relation, said members having curved slots cut therein, a series of containers having rod extensions adapted to seat in the guide members, said containers being adapted to receive a mixture of ground phosphate rock and an acid, a cylindrical stationary housing enclosing the containers, a cover for the housing, a cylindrical member attached to the inside of the housing and concentric therewith, a flexible closure means radially attached to the housing and the concentric member, means mounted upon the housing cover to agitate the mixture in the containers comprising a plurality of blades mounted upon independent shafts, means to rotate the shafts, and means to discharge the containers at a predetermined time.

27. An apparatus for manufacturing acid phosphate comprising a revoluble frame, means to rotate the frame intermittently, a plurality of guide members mounted upon the frame in spaced relation, said members having curved slots cut therein, a series of containers having rod extensions adapted to seat in the guide members, said containers being adapted to receive a mixture of ground phosphate rock and acid, a cylindrical stationary housing enclosing the containers, a cover for the housing, a cylindrical member attached to the inside of the housing and concentric therewith, a flexible closure means radially attached to the housing and the concentric member, means mounted upon the housing cover to agitate the mixture in the containers comprising groups of blades attached to independent shafts, a cylindrical casing having openings therein slidably mounted upon the shafts above the blades, means to adjust the height of the blades with respect to the containers, means to rotate the shafts, and means to discharge the containers at a predetermined time.

28. An apparatus for manufacturing acid phosphate comprising a revoluble frame, means to rotate the frame intermittently, a plurality of guide members mounted upon the frame in spaced relation, said members having curved slots therein, a series of containers having rod extensions adapted to seat in the guide members, said containers being adapted to receive a mixture of ground phosphate rock and an acid, a cylindrical stationary housing enclosing the containers, a cover for the housing, a cylindrical member attached to the inside of the housing and concentric therewith, a compartment formed within the housing, a flexible closure means radially attached to the housing and the concentric member, means mounted upon the cover adjacent to the compartment adapted to agitate the mixture in the containers comprising a plurality of blades mounted upon independent shafts, means to rotate the shafts, and means to discharge the containers at a predetermined time during the revolution of the frame.

29. An apparatus for manufacturing acid phosphate comprising a revoluble frame, means to rotate the frame intermittently, a plurality of guide members mounted upon the frame in spaced relation, said members having curved slots cut therein, a series of containers having a plurality of rod extensions, two of the rod extensions being attached to the containers at diametrically opposite positions and adapted to seat in the guide members, said containers being adapted to receive a mixture of ground phosphate rock and an acid, a cylindrical stationary housing enclosing the containers, a cover for the housing, means mounted upon the housing cover adapted to agitate the mixture in the containers and trip members attached to the housing adapted to cooperate with rod extensions on the containers to discharge the containers at a predetermined time during the revolution of the frame.

In testimony whereof I affix my signature.

BEVERLY OBER.